United States Patent
Tirkel et al.

(10) Patent No.: US 7,176,828 B2
(45) Date of Patent: Feb. 13, 2007

(54) NEAR-FIELD ANTENNA ARRAY WITH SIGNAL PROCESSING

(75) Inventors: Anatol Zygmunt Tirkel, East Brighton (AU); Jerzy Fryderyk Gadek, East Brighton (AU)

(73) Assignee: J.I. Peston Pty Ltd, Archerfield ( * ) Notice: Subject to any disclaimer, the term of this patent is extended or adjusted under 35 U.S.C. 154(b) by 144 days.

(21) Appl. No.: 11/052,732

(22) Filed: Feb. 4, 2005

(65) Prior Publication Data

US 2005/0212691 A1    Sep. 29, 2005

(51) Int. Cl.
*G01S 13/62* (2006.01)

(52) U.S. Cl. .................... 342/22; 342/28; 342/114; 342/115; 342/194

(58) Field of Classification Search .............. 342/22, 342/28, 114, 115, 194, 195
See application file for complete search history.

(56) References Cited

U.S. PATENT DOCUMENTS

| | | | | |
|---|---|---|---|---|
| 4,155,259 | A | | 5/1979 | Engeler .................... 73/626 |
| 4,810,998 | A | * | 3/1989 | Hwang .................... 340/541 |
| 5,036,333 | A | | 7/1991 | Chapman et al. .......... 342/370 |
| 5,559,516 | A | | 9/1996 | Didomizio et al. ........ 342/118 |
| 5,856,804 | A | | 1/1999 | Turcotte et al. ........... 342/371 |
| 6,337,625 | B1 | * | 1/2002 | Taylor et al. .............. 340/541 |
| 6,380,882 | B1 | * | 4/2002 | Hegnauer ................... 342/28 |
| 6,426,716 | B1 | * | 7/2002 | McEwan ..................... 342/28 |
| 6,650,276 | B2 | * | 11/2003 | Lawless ..................... 342/28 |
| 2003/0052811 | A1 | * | 3/2003 | Lawless ..................... 342/28 |
| 2005/0104764 | A1 | * | 5/2005 | Young ....................... 342/27 |
| 2005/0134466 | A1 | * | 6/2005 | Tirkel ...................... 340/573.2 |
| 2005/0212691 | A1 | * | 9/2005 | Tirkel et al. ............... 342/22 |

FOREIGN PATENT DOCUMENTS

| | | |
|---|---|---|
| AU | B 67816/96 | 4/1996 |
| DE | 19801552 | 7/1999 |
| WO | WO2001/58047 A1 | 8/2001 |
| WO | WO 2004/015450 A1 | 2/2004 |

OTHER PUBLICATIONS

"High-tech pest tracker ; 'Changes the game' in fight against voracious termites", Martha McKay, Staff Writer. The Record. Bergen County, N.J.: Apr. 4, 2003. p. B.01.*

"Wideband random noise short range radar with correlation processing for detection of slow moving objects behind the obstacles", Chapursky, V.V. et al Ground Penetrating Radar, 2004. Proceedings of the Tenth Int'l Conf. on vol. 1, Ps: 199-202.*

* cited by examiner

*Primary Examiner*—John B. Sotomayor
(74) *Attorney, Agent, or Firm*—Buchalter Nemer

(57) ABSTRACT

Method and apparatus for extracting coherent information from in-phase (I) and quadrature (Q) signals. In a form, signals from an antenna array are mixed to form a plurality of I and Q signals that combined to form respective complex vectors. Each vector is adjusted in phase and magnitude to compensate for variations in field signal patterns, summed with other vectors, spatially and temporally filtered, and processed using spectral analysis algorithms to extract coherent spatial information. The coherent spatial information may be used to detect the presence, number and activity of insects within a structure in the near field of the antenna.

21 Claims, 5 Drawing Sheets

NEAR-FIELD ANTENNA ARRAY WITH SIGNAL PROCESSING

TECHNICAL FIELD OF THE INVENTION

This invention relates to signal processing for array antennas and in particular to an antenna wherein its field pattern can be controlled electronically to obtain information about the nature of insect infestation in materials.

BACKGROUND OF THE INVENTION

Conventional imaging radar requires the control of transmitted and/or received wavefronts (beamforming). In particular, target detection systems as used in military and commercial applications require accurate beam steering of transmitted signals to detect and identify targets.

In an analogous application, detection of the presence of insects, such as termites, in a structure requires accurate signal transmission and processing. Australian Patent AU 693039 assigned to the present applicant, describes a system for detecting the presence of insects in a structure by transmitting a microwave signal into a wall. Any disturbances in the received signal are detected and processed to indicate the presence or otherwise of insects.

The above system however, is not able to determine the number, species and activity of the insects. Control and processing of the field pattern of the antenna is required to accurately determine the presence, location and type of activity of insects.

Typically, in most conventional applications, far field beam steering is performed. It is also possible to control the transmitted near field pattern of a transmit antenna. However, this is expensive and difficult to do, as it is necessary to control the magnitude and phase of the carrier signal to each transmitter array element. Typically PIN diode phase shifters and attenuators are used. Phase control and magnitude control is poor, even with three bits of phase control, which is already difficult to achieve. Illumination control of the transmitted near field pattern in general is ineffective when transmitting into an inhomogeneous structure such as a wall in a house.

OBJECT OF THE INVENTION

It is an object of the invention to provide a receiving antenna having a controlled field pattern, by digital beamforming of the receiver array signals.

It is a further object of the invention to provide an antenna for use in detecting the presence, number and activity of insects in a structure in a microwave signal detection system.

SUMMARY OF THE INVENTION

In one form, although it need not be the only or indeed the broadest form, the invention resides in an antenna assembly comprising:

an array of receiving elements that receive signals transmitted into a field of the array at least at one frequency;

mixer means that combines the received signals with a reference signal to extract in-phase (I) and quadrature (Q) IF signals from the received signals, wherein, the I and Q signals are combined to form complex signal vectors;

adjusting means that adjust phase and magnitude values of each of said complex signal vectors;

summing means that sum the adjusted complex signal vectors; and processing means that spatially and temporally filter said summed complex signal vectors to detect changes in the field due to moving objects.

Preferably the received signal is a microwave signal reflected from a target in the field.

The microwave signal is preferably at a nominal frequency of 24 GHz. The microwave signal may be at a second nominal frequency of 61 GHz.

The phase and magnitude values for adjusting the complex signal vectors to achieve beam steering, focusing and scanning can be computed adaptively or looked up from a fixed look up table.

The processing means may include filter means for filtering said summed signal.

The processing means may include amplification means for amplifying the summed complex signal, which may be filtered, by said filter means. In another form of the invention there is provided a system for detecting insects, insect numbers and their activity in a structure, the system comprising:

signal generator means operatively coupled to a transmitter means to thereby transmit microwave signals at least at one frequency into a part of the structure;

an array of receiving elements for receiving said microwave signals in a field of the array of receiving elements, at said at least one frequency; and processor means for processing and controlling the received field signal to provide an output signal indicating the presence, activity and numbers of insects.

DETAILED DESCRIPTION OF THE PREFERRED EMBODIMENT

In a preferred form, the invention will be described with reference to a smart antenna as may be used in a system for detecting the presence of pests, namely termites, in a structure using microwave signals. However, it should be noted that the invention can also be used in other applications requiring smart antennas. Furthermore, the description emphasises the application to near-field antenna patterns but the invention is not limited to this specific situation.

The applicant's prior Australian patent, AU 693039 describes a system for detecting the presence of insects in a structure using microwave signals, which description is incorporated herein by reference. The present invention will be described briefly with reference to that system.

Figure 1:
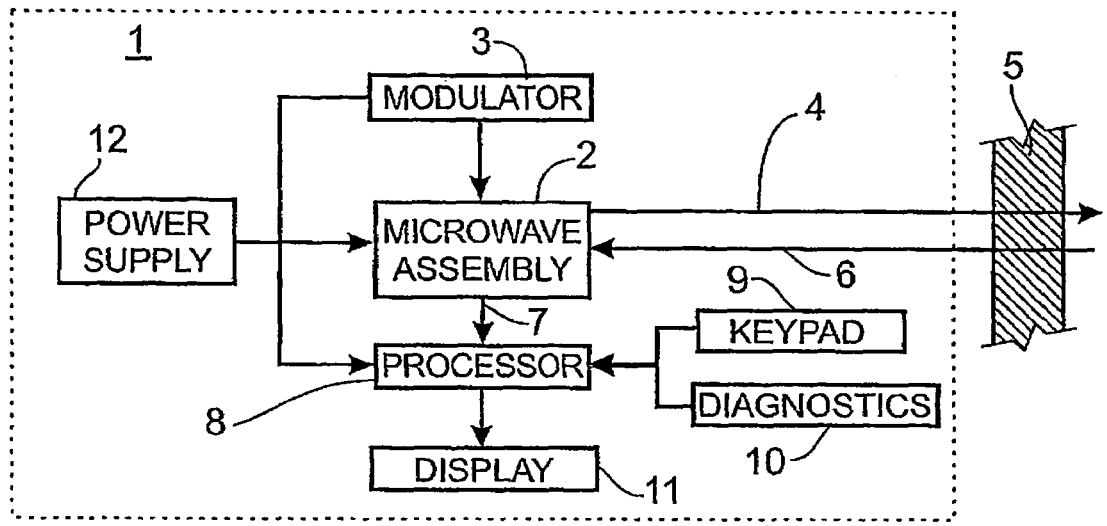
FIG. 1 is block diagram of a system for detecting insects.

Referring to FIG. 1, there is shown a block diagram of a system 1 for detecting insects, such as termites as described in AU 693039. The system 1 comprises a microwave assembly 2 that transmits a continuous wave (or pulsed) microwave signal at a frequency of 24.125 GHz. The signal may be modulated by modulator 3.

Signals 4 are transmitted into region 5 to detect the presence or otherwise of termites or other insects. Reflected signals 6 are passed 7 to a processor 8 for signal processing. Commands and programming may be input to the processor from the (optional) keypad 9 or from various optional diagnostics 10. The output from the processor is displayed on a display 11.

Figure 2:
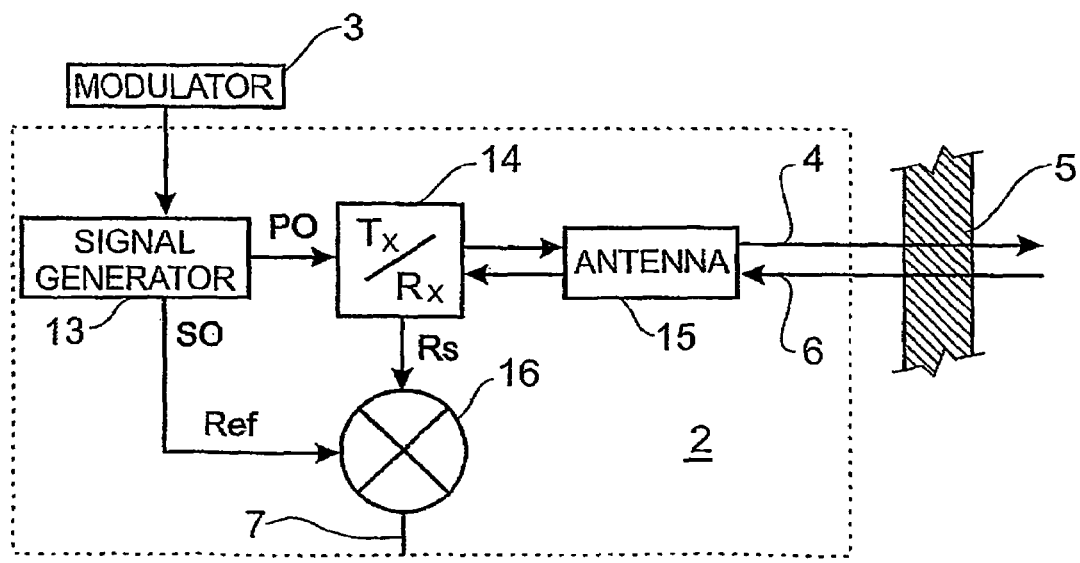
FIG. 2 is a block diagram of the microwave assembly of FIG. 1.

Referring to FIG. 2, the elements of the microwave assembly 2 are shown in more detail. The assembly includes a signal generator 13 for generating the signal at 24.125 GHz at a primary output, PO. The primary output PO is connected to a receiver and transmitter unit 14, which is coupled to antenna 15. In use, the antenna is located closely adjacent or in abutting relationship with the region 5, which is most often a wall but may be another part of the structure.

A secondary output SO of signal generator 13 provides a reference or Local Oscillator (LO) signal, Ref, to one input of a mixer 16. The other input of mixer 16 is connected to the receiver circuitry of the receiver/transmitter unit 14, from which a received signal Rs is provided.

Mixer 16 combines reference signal Ref and received signal Rs to provide a combined signal Cs comprising a beat frequency component at the output of mixer 16.

The signal is then filtered, amplified, digitised and processed in processor 8 and displayed on display 11 to indicate the presence of insects.

Figure 3:
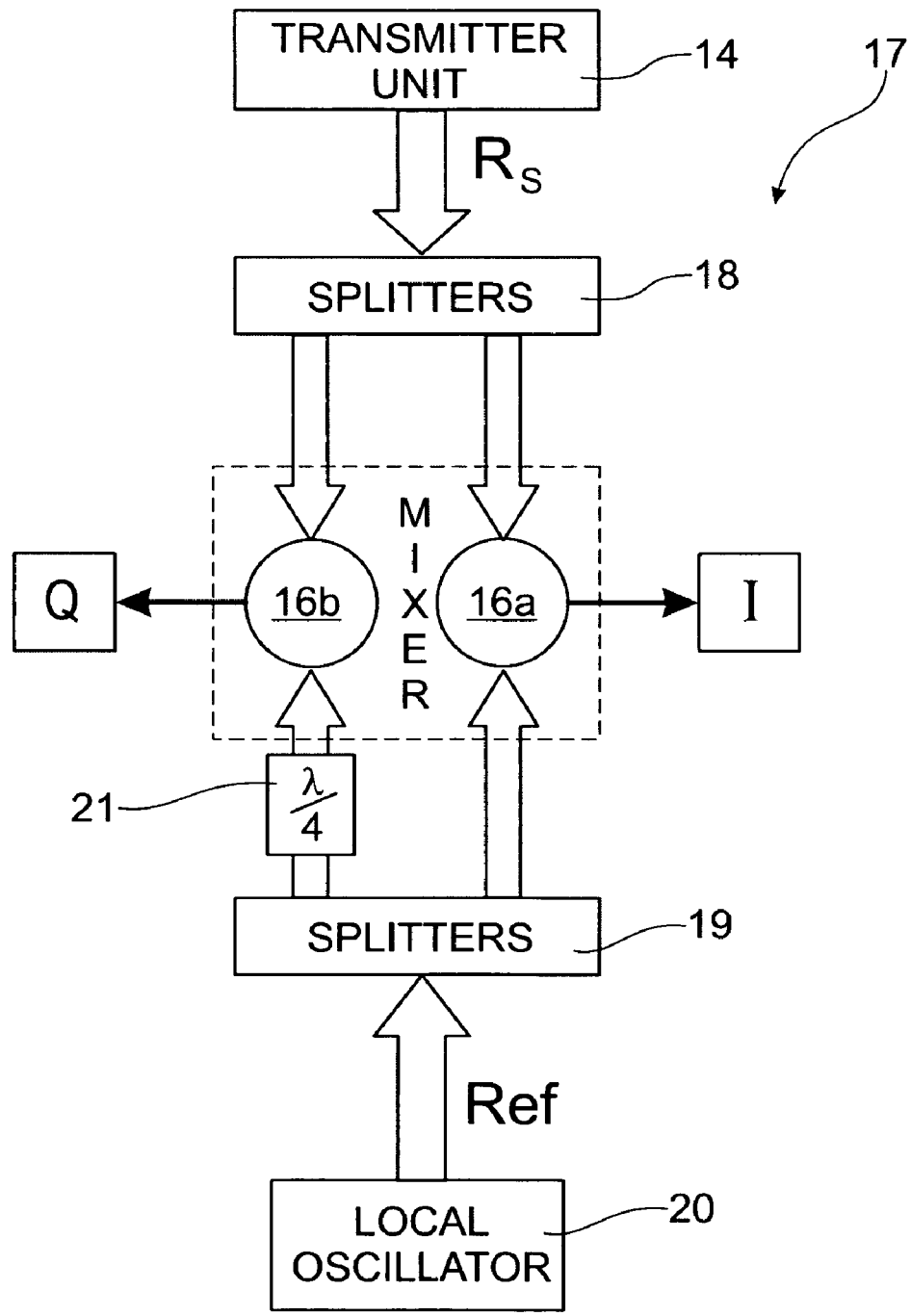
FIG. 3 is a block diagram of a smart antenna data acquisition circuit in accordance with the invention.

Referring to FIG. 3, there is shown a block diagram of a smart antenna data acquisition circuit 17 in accordance with the invention. In this embodiment, the data acquisition circuit 17 will be described having regard to the insect presence detection system 1 and the microwave assembly 2 in FIG. 2. In the present embodiment, a transmit antenna (not shown) is coupled to a transmitter/receiver unit 14 and microwave signal generator 13.

Figure 4:
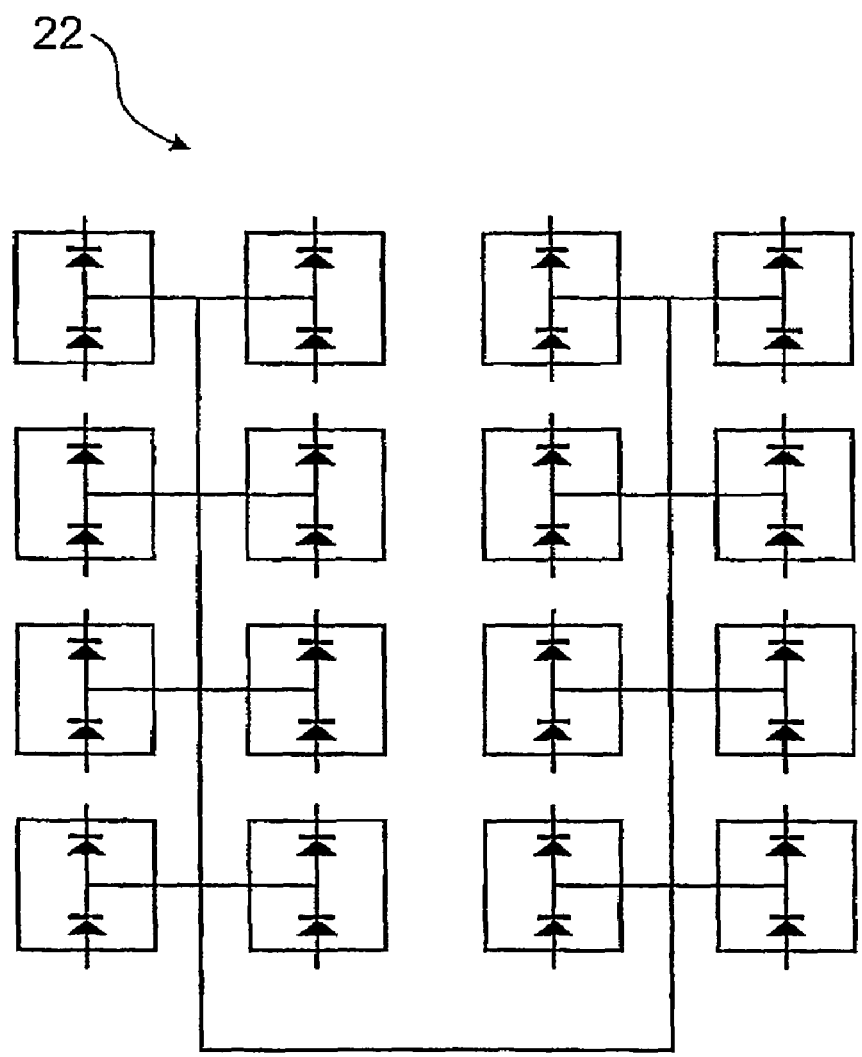
FIG. 4 is a block diagram of a smart antenna in accordance with the invention.

A receiver antenna 22 can be an array of sixteen elements (this number is chosen for illustrative purposes only) in planar configuration as shown schematically in FIG. 4. Other transmitter configurations are possible. The line shows the distribution of the LO (Local Oscillator) to 32 mixer diodes. One of the diodes in each pair associated with the same antenna element is fed with a quarter wavelength delay. This is to provide an output Q channel. The other diode outputs the I channel. The antenna elements can be rectangular patches on microstrip. However, it should be noted that skilled in the art. In the present application for detecting insects in a wall, a planar antenna structure is easy to manoeuvre behind obstacles, such as cupboards, and covers a larger area than a single element.

The receiver antenna 22 receives signals in each of the elements in the array at the transmitter/receiver unit 14. The received signal Rs is split and distributed by a first set of splitters 18. The splitters are conventional broadband Wilkinson power dividers, however, other types of signal distributors may also be used.

A second set of power splitters 19 distributes a local oscillator signal to mixers 16a and 16b. The local oscillator drive to the Q mixer 16b is delayed by ¼ wavelength in a delay unit 21 with respect to the I mixer 16a. Other methods of generating a differential phase shift of 90 degrees, such as quadrature hybrids could be used.

The received signal Rs is distributed (in phase) to mixers 16a and 16b. Mixers 16a and 16b combine reference signal Ref from local oscillator 20 in the signal generator 13, with received signal Rs to extract I and Q IF components of the received signal respectively (0.1–10 Hz typically).

In this arrangement, the received microwave frequencies at 24.125 and 61 GHz are processed to extract the I and Q components. A Field Effect Transistor (FET) Voltage Controlled Oscillator (VCO) is tuned to an output frequency between 12.0625 GHz and 12.2 GHz. A comb generator (harmonic generator) produces integer multiples of the fundamental frequency. Then a second harmonic of 12.0625 GHz (24.125 GHz) and a fifth harmonic of 12.2 GHz (61 GHz) are centred in the two ISM bands. The selection of the appropriate harmonics is performed by bandpass filters.

These frequencies are chosen purely on the basis that they are in the ISM (Industrial, Scientific and Medical) bands and as such permit unlicensed transmission. The principle of receiver beamforming described herein is not restricted to any particular frequency of operation. The principle applies for the near, intermediate and far fields of all the antennas and antenna arrays involved.

A total of sixteen vector signals are extracted, representing I and Q components of the received signal from the sixteen elements of the receiver antenna array.

The antenna data acquisition circuit 17 of the present invention provides complex vector signals containing temporal information about the reflections from a host material such as a wall and potential targets within, such as insects. Each complex vector signal further contains information on in-phase and quadrature information (coherent data) and spatial data, since there are sixteen spatial points in the near field pattern at which the signals are detected.

The complex vector signals containing the above information can be processed to control the field pattern at a receiving antenna, in accordance with the invention. In the application to the pest presence detection system of FIG. 1, the near field pattern of the receiver antenna is controlled and processed to detect the presence, activity, numbers and types of insects in a structure such as a wall.

Figure 5:
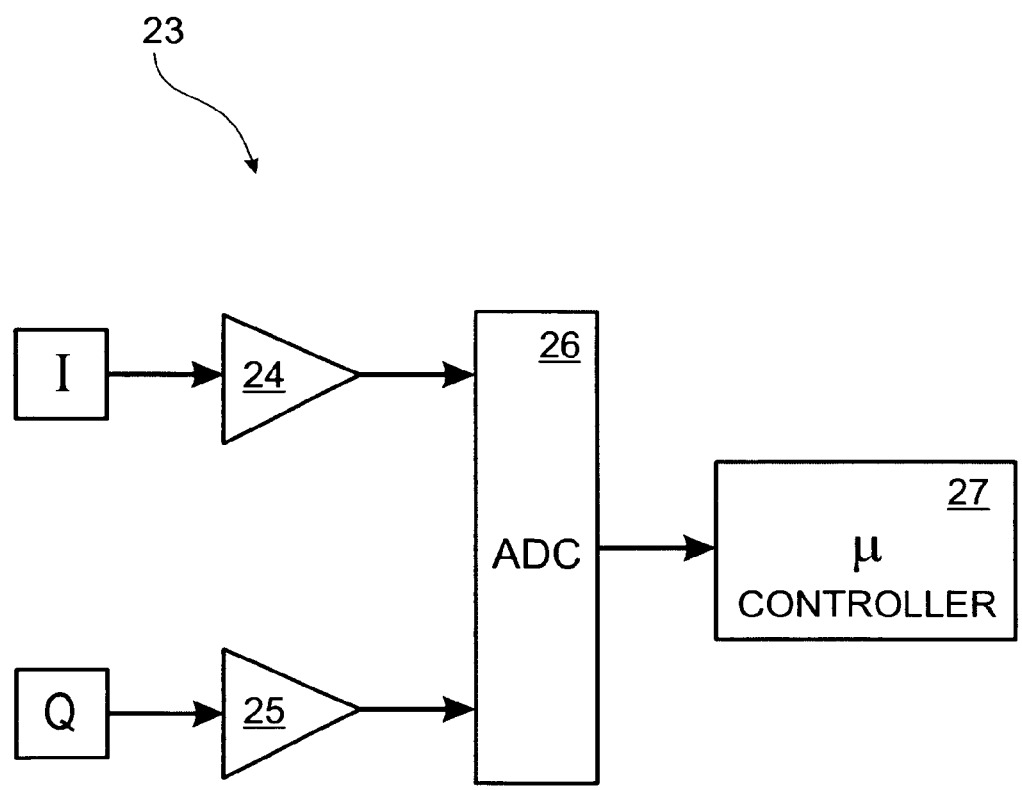
FIG. 5 is a block diagram of the processing circuit of a smart antenna in accordance with the invention.

Referring now to FIG. 5, there is shown a block, diagram of a processing circuit 23 for processing the acquired complex vector signals to control and process the field pattern in accordance with the invention.

The complex vector signals I and Q represent the real and imaginary components of the complex vector signals. The I and Q signals are pre-filtered and amplified by bandpass amplifiers 24 and 25 respectively. The filters are analog band pass filters, typically having a lower cut-off frequency of 0.1 Hz and an upper cut-off frequency of up to 100 Hz. The purpose of these filters is to reduce aliasing and offsets in the digital processing. Any controlled filtering can be performed by the microcontroller using standard IIR, FIR or DFT/DCT algorithms.

The filtered and amplified signals are digitised by an analog to digital converter 26. A processor means such as a microcontroller 27 receives the digitised signals and performs signal processing.

The microcontroller 27 is programmed with an algorithm for processing the digitised complex vector signals to control the near field pattern of the receiver antenna 22. In one form, the microcontroller processes the signals to provide spherical beamforming of the near field pattern. The microcontroller performs the following steps:

1. Signals from each mixer are converted into polar form. A look up table (LUT) is generated from calibration for a test target, so it includes compensation for inaccuracies in the ¼ wavelength delay in the Q component and mixer imbalance including other static differential errors. The LUT is used to perform the Cartesian to Polar conversion and compensation for inaccuracies.

2. The phase of each signal is modified according to a spherical wavefront emanating from a grid of likely sources (focus points) from within a reasonable target volume, for example an area of 100 mm long, 100 mm wide by 10 mm deep. The grid can be 5 mm in length and width and 2 mm in depth, making up 2000 points. The exact grid location and spacing is determined by the application, so that aliasing is avoided in the phase domain. Such aliasing can result in ambiguities and spurious target detection.

3. The sixteen complex signals are summed coherently (complex or vector) for each focus point.

The summed signal magnitude and phase distribution is analysed using spectral analysis such as Fourier Transform to spatially locate targets within the grid.

The raw complex I and Q signals received by the antenna array contain errors due to imperfections in the antenna geometry, differences between array elements, electromagnetic coupling between elements, differences in the response characteristics of mixers, uneven amplitude and phase distribution of LO (reference), and other factors. These imperfections can be corrected by calibration on a "point" transmitting antenna. The corrected received signals can then be adjusted to steer and/or focus the array onto a specific target or scan through a large target volume to produce an image. Since most of the detection is likely to involve the presence of inhomogeneous, anisotropic materials such as timber, plasterboard, concrete etc, the field patterns are distorted by the material. In such cases, an additional calibration can be obtained by placing cooperative target or targets in accessible positions, such as behind the wall or in the wall cavity. Such cooperative targets may involve modulated scatterers, for easy target recognition and discrimination. Additionally, such cooperative targets can be designed to offer effective scattering cross-sections, commensurate with that of the insects being detected. Insects also present a fluctuating scattering cross-section because of relative movement of their body parts with respect to the electric and magnetic fields of the microwave signal.

Figure 6:
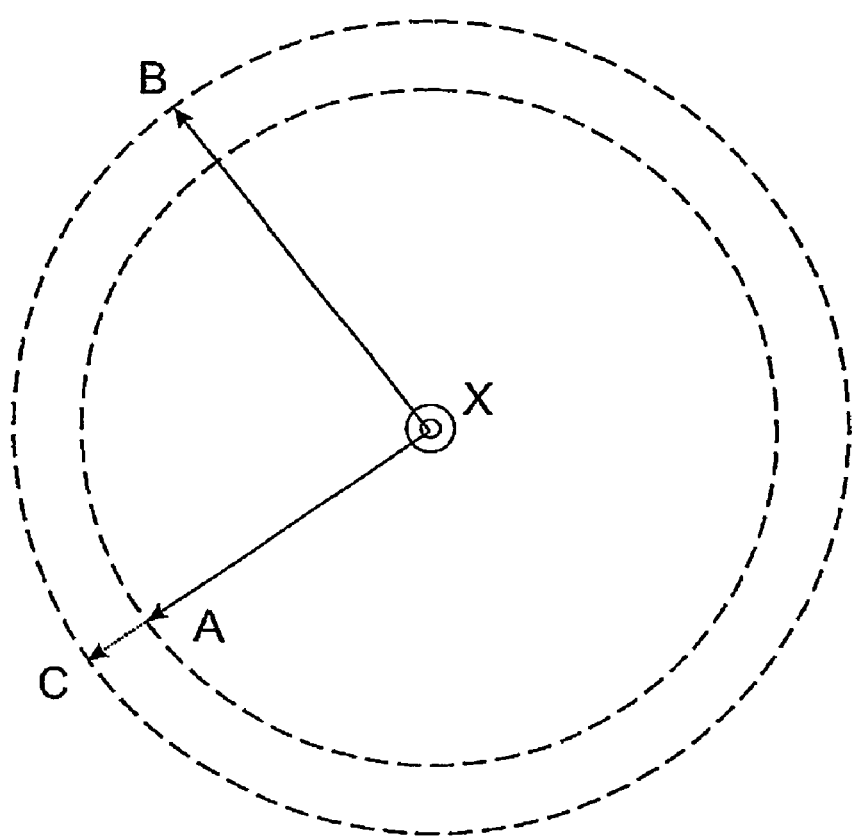
FIG. 6 is an illustrative example of spatially locating targets in a receive pattern grid of a smart antenna array.

A correction example is described below with reference to FIG. 6. Consider focusing a spherical wavefront on a point X in three-dimensional space (one of 2000 or so grid points). Array element B (say) is on the correct radius XB. Consider an array element A. Its distance from X is XA which is smaller than XB. The output of the mixer at A needs to be delayed by an amount equivalent to AC. The latter can be translated into a phase shift of $(AC/\lambda) \times 360$ degrees. Say that the measured polar signal at A has the magnitude $M_A$ and phase $\theta_A$ (degrees). Then the corrected phase is $\theta_A + (AC/\theta) \times 360$. Similar corrections are performed for all array elements. The microprocessor performs this rotation of a complex number. A slight magnitude correction can also be performed to compensate for the $1/r^2$ signal reduction with range, since the scattered signal from a point target propagates in a spherical wavefront.

After all signals from all the array elements are corrected for these phase errors, the signals are converted back to Cartesian format. I signals are added together and Q signals are added together (coherently) and a total vector is computed, whose magnitude is M and phase is $\theta$. The values of M are computed for each of the 2000 or so grid points and histogrammed. Any major peaks in such a histogram are likely to be due to point scatterers at the respective grid points.

A main advantage of the method is that when focused on a target point, the signals from all the receiver antennas are summed in phase (coherently). The signals from all other targets have random phases and thus on average sum to zero. Currently, the single large aperture antenna produces a scrambled sum (Fresnel Integral) of all targets and spurious reflections. This applies to desirable targets as well, since RF energy takes different paths to arrive at the single mixer and hence every target suffers from mutual and self interference. The objective of the signal processing algorithm is to obtain the maximum amount of coherent spatial information about the targets and their spatial distribution.

In one embodiment as applied to an insect presence detection system, the wavefront from the target (insect) is not likely to be truly spherical, mainly because of refraction at the material boundaries. Walls, including studs and noggins, can cause these refractions. Materials such as timber, concrete, plasterboard etc may be inhomogeneous and anisotropic and distort the wavefront in unknown and unpredictable ways.

Once an estimate of target location is obtained, the phase front can be fine tuned to obtain a more accurate target location by using maximum entropy or fuzzy logic techniques, typically implemented using neural nets. Refraction is compensated by deliberate distortion of the phase front. A person skilled in the art would have readily available to them, various techniques in fuzzy logic.

In one example, assume a local maximum is found for a spherical beamfront, with X as the grid point at the centre of the sphere. The beamfront can be deliberately perturbed from its spherical shape and the magnitude of the new, coherently summed signal is compared with its previous (unperturbed) value. If the perturbation has resulted in a larger signal, it is accepted and further adjustments are made. Otherwise, it is rejected and another (different) perturbation introduced. The rules on the choice of perturbations can be obtained from a neural net, with fuzzy logic, or by similar techniques, such as maximum entropy filtering.

The number of local maxima indicates the number of scatterers and hence the number of insects. The magnitude of each peak indicates the size of each insect. These estimates can be refined by applying signal processing in the time domain (tracking). This reduces the number of false or stationary targets and the number of missed targets.

In an alternate embodiment, a dynamic or close to real time version of the signal processing can be realised by splitting the time series from each mixer 16a, 16b into separate (overlapping or contiguous) segments (frames) and performing similar beamforming analysis on each frame. This can be followed by target tracking, using Hidden Markov chain processing. Hidden Markov tracking is achieved by obtaining overlapping FFT's of the signal time series and assigning probabilities to causal relationships between frequency bins in adjacent FFT's. Eventually deterministic signals are all that survive this process and the probabilities of tracking such events tend to 1.

Other alternative models may be used for target tracking, such as a Kalman filter. The principles and operation of Kalman Filtering can be found in numerous publications including, "Estimation of tracking: Principles, techniques and software" by Bar-Shalom Yaakov; Li Xiao-Rong, published by YBS publishing, (1993 by Artech House Inc).

Performing a frequency sweep of the local oscillator during the measurement period can enhance the dynamic processing. Such a sweep can either be digital (stepped) or analogue (chirp). Either could be used to assist in range resolution and ambiguity resolution of the received near field pattern. The resulting signals can be analysed by Gabor or wavelet processing (Frequency-Time FT analysis). Further details of the operation and implementation of Gabor processing may be found in "Gabor representation and signal detection, Gabor analysis and algorithms: Theory and applications" by Friedlander, B. Department of Electrical and Computer Engineering, University of California, Davis, Calif.: Zeira, A. Signal Processing Technology, Palo Alto, Calif., 1997, Page 353–380.

In another form of the invention, microwave signals at 24 GHz and 61 GHz are received and analysed to determine the type of target detected. A comparison of the two near filed patterns can be used to determine a species of insect, type and size. Spectral analysis such as a spatial Fourier transform may be performed to determine insect species.

The "imaging" algorithm discussed in the above description assumes that the target is a point. In a realistic situation, the target has non-zero spatial dimensions and spatial structure. This results in magnitude and phase variations in the scattered wavefront. Magnitude effects arise because signals reflected from different parts of the target have different phases and cause constructive/destructive interference (diffraction pattern). A spatial (discrete) Fourier Transform of the signals from the receiver array can reveal key features of this diffraction pattern and thus, an estimate of the spatial extent of the target. (Under ideal conditions, it is possible to carry this technique to its limit: a full reconstruction of the target geometry by an inversion process.)

Additional information about the target size and geometry may be obtained by repeating the "imaging" process at different microwave frequencies. Two factors contribute to this:

1. The receiver array has different angular resolution and ambiguity pattern at different microwave frequencies. The combination of measurements at different frequencies reduces overall ambiguities and improves resolution.
2. The target scattering cross-section is a function of the ratio of target size to the wavelength $\lambda$. For $d/\lambda \ll 1$ the cross-section varies as $\lambda^{-4}$ (Rayleigh). For $d/\lambda \gg 1$ the cross-section is constant and approximately the physical size of the target (optical region). For $d/\lambda \approx 1$ the cross-section oscillates dramatically (Mie or resonance region). The wavelengths involved are 12 mm @24 GHz and 5 mm @61 GHz (the two ISM frequencies). Measurements of the ratio of received signals at the two frequencies provide discrimination of insects larger than about 20 mm and smaller than about 2.5 mm.

The invention is not limited to imaging applications. The method permits the generation and control of an arbitrary receiver near field pattern. For example, a zone pattern may be generated for the purposes of detection and counting of zone transits by insects or other moving objects. Such techniques are well known in the security industry. For example, a standard PIR (Passive Infrared) security sensor usually includes a special Fresnel Lens to generate a fixed zone pattern.

The present invention provides a control and processing of the field pattern of a receiver antenna array. It provides accurate detection and determination of the type of target in a spatial region in the near field of an antenna.

The array of elements in the receiver antenna of the present invention provides significant advantages over a single element:

1. At least 3 dB SNR improvement due to coherent processing;
2. Suppression of destructive interference between Fresnel zones;
3. Suppression of spurious static reflections;
4. Suppression of spurious microphonic effects due to operator handshake;
5. Tracking of insect movement;
6. Deliberate placement of nodes and/or antinodes at specific spatial locations; and
7. Indication of the direction of motion of the insects. This is useful in identifying insect galleries and in tracking these back to the nest.

In an alternative embodiment of the invention, deliberate placement and control of nulls (and maxima) are provided in the receiver pattern of the array. For example, the nulls can be made to form concentric circles 10 mm apart. Insect movement across these maxima and minima result in fluctuations of the received signal. Temporal analysis of these fluctuations can reveal insect activity. This implementation provides information with simpler processing. However, it is difficult to separate the information about insect numbers from insect speed. Hence, this method may be used as a "watchdog operation". Insect activity above a threshold can be used to trigger the instrument into full imaging mode. In another variant, the placement of maxima and nulls may be directional, in order to compute the direction of motion of the insects directly.

This mode of operation can be enhanced by adding a mechanism to provoke the target insects into activity. The provocation may take the firm of a mechanical disturbance, an acoustic disturbance or an electromagnetic disturbance. It is known that certain acoustic and electromagnetic frequencies disturb insects, which will cause greater movement and therefore lead to stronger and more frequent disturbances of the electromagnetic fields. A thorough exposition on methods of insect control using electromagnetic emissions is presented by Philip Callahan in U.S. Pat. No. 5,528,049, (1996), which also refers to prior art.

The invention has been described with reference to exemplary embodiments. However, it should be noted that other embodiments are envisaged within the spirit and scope of the invention.

The invention claimed is:

1. An electromagnetic antenna assembly for detecting moving insects in a region comprising:
    an array of receiving elements that receive signals transmitted into a field of the array in the region at least at one frequency;
    mixer means that combines the received signals with a reference signal to extract in-phase (I) and quadrature (Q) IF signals from the received signals, wherein the I and Q signals are combined to form complex signal vectors;
    adjusting means that adjust phase and magnitude values of each of said complex signal vectors in real time to create a beamfront that is deliberately distorted such that the beamfront has a plurality of maxima and minima values;
    summing means that sum the adjusted complex signal vectors; and
    processing means that spatially and temporally filter said summed complex signal vectors to detect changes in the field over time corresponding to at least one path of said insects moving in said region.

2. The antenna assembly of claim 1 wherein the array of receiving elements are adapted to receive microwave signals reflected from a target in the field.

3. The antenna assembly of claim 1 wherein the processing means is adapted to detect the moving insects in a near field of said antenna.

4. The antenna assembly of claim 1 wherein the adjusting means compensates for received signal imperfections.

5. The antenna assembly of claim 4 wherein the adjusting means adjusts the magnitude and phase values to produce a desired antenna field pattern.

6. The antenna assembly of claim 1 wherein the processing means produces an image of the moving insects in the field.

7. The antenna assembly of claim 2 wherein the microwave signal is at a frequency of nominally 24 GHz.

8. The antenna assembly of claim 2 wherein the microwave signal is at a frequency of nominally 61 GHz.

9. The antenna assembly of claim 2 wherein a first microwave signal is at a frequency of nominally 24 GHz and a second microwave signal is at a frequency of nominally 61 GHz.

10. The antenna assembly of claim 1 wherein the processing means includes filter means for filtering said summed signal.

11. The antenna assembly of claim 1 wherein the processing means includes amplification means for amplifying the summed complex signal.

12. A method of extracting coherent spatial information from signals received by the elements of a microwave antenna array for detecting moving insects in a region including the steps of:
    mixing signals from the antenna array with a local oscillator signal to extract in-phase (I) and quadrature (Q) IF signals;
    combining the I and Q signals to form complex signal vectors;
    adjusting phase and magnitude values of the complex signal vectors in real time to create a beamfront that is deliberately distorted such that the beamfront has a plurality of maxima and minima values;
    summing the adjusted complex signal vectors to form total signal vectors; and
    processing the total signal vectors using spectral analysis algorithms to extract said coherent spatial information to detect changes in the field over time corresponding to at least one path of said insects moving in said region.

13. The method of claim 12 wherein the spectral analysis algorithms are Fourier transform algorithms.

14. The method of claim 12 wherein the phase and magnitude values are computed adaptively.

15. The method of claim 12 wherein the phase and magnitude values are looked up from a fixed look up table.

16. The method of claim 12 further including the step of computing phase and magnitude values from calibration obtained by focusing the receiver antenna onto a cooperative scatterer or scatterers placed in strategic or accessible locations within or near the structure under test.

17. The method of claim 12 further including the step of computing magnitude and phase values that adjust the field signal patterns of said antenna array to have a controlled geometry of equal phase and equal amplitude contours.

18. The method of claim 17 wherein the equal phase and equal amplitude contours are arranged in a manner where insect motion is likely to cross said contours.

19. The method of claim 17 further including the step of detecting phase or amplitude modulation of the received signal resulting from temporal fluctuations in the I and Q signals induced by crossings of equal phase and equal amplitude contours.

20. The method of claim 12 further including the step of converting I and Q channel fluctuations into polar format and computing fluctuations in magnitude and phase of the received signal.

21. A signal processor for extracting near or far field signals from an electromagnetic antenna array for detecting moving insects in a region comprising:
    mixer means adapted to extract in-phase (I) and quadrature (Q) signals from signals received by receiving elements of the antenna array in the region;
    converter means adapted to combine the I and Q signals to form complex signal vectors, adjust the phase and amplitude of the complex signal vectors in real time to create a beamfront that is deliberately distorted such that the beamfront has a plurality of maxima and minima values, and add the complex signal vectors to form total vectors; and
    processor means adapted to process the total vectors to extract coherent spatial information to detect changes in the field over time corresponding to at least one path of said insects moving in said region.

* * * * *